United States Patent [19]

Bisel et al.

[11] Patent Number: 5,036,930
[45] Date of Patent: Aug. 6, 1991

[54] ELECTROMAGNETICALLY POWERED ENGINE APPARATUS AND METHOD

[76] Inventors: Charley W. Bisel, 286 E. 12th Ave., Broomfield, Colo. 80501; Alvin B. Simpson, 437 W. Scott, Clovis, Calif. 93612

[21] Appl. No.: 524,189

[22] Filed: May 17, 1990

[51] Int. Cl.$^5$ ............................................. B60K 1/00
[52] U.S. Cl. ..................................... 180/65.1; 310/15
[58] Field of Search .............. 180/65.1, 65.3; 310/14, 310/15, 17, 46, 152, 20, 23

[56] References Cited

U.S. PATENT DOCUMENTS 3,105,162 9/1963 Stevenson ............................. 310/23
3,861,487 1/1975 Gill ....................................... 180/65.3
4,507,579 3/1985 Turner ................................... 310/15

*Primary Examiner*—Andres Kashnikow
*Assistant Examiner*—Richard Camby
*Attorney, Agent, or Firm*—Victor Flores

[57] ABSTRACT

The present invention teaches an engine system apparatus and method that converts pulsed electromagnetic energy into mechanical force and motion. The engine apparatus combines the reciprocating action of an internal combustion engine and utilizes electrical energy to produce a magnetic field that initiates a repelling power stroke that is maintained in a reciprocating state by a movable magnet that is attracted to a stationary electromagnet member of the system. An electrical power source is pulsed ON to repeatedly produce the repelling power stroke and pulsed OFF to repeatedly allow the movable magnet to attract to the stationary electromagnet. The underlying principles of the electromagnet engine allow engine configurations to be built having one stationary electromagnet and one movable permanent magnet.

26 Claims, 4 Drawing Sheets

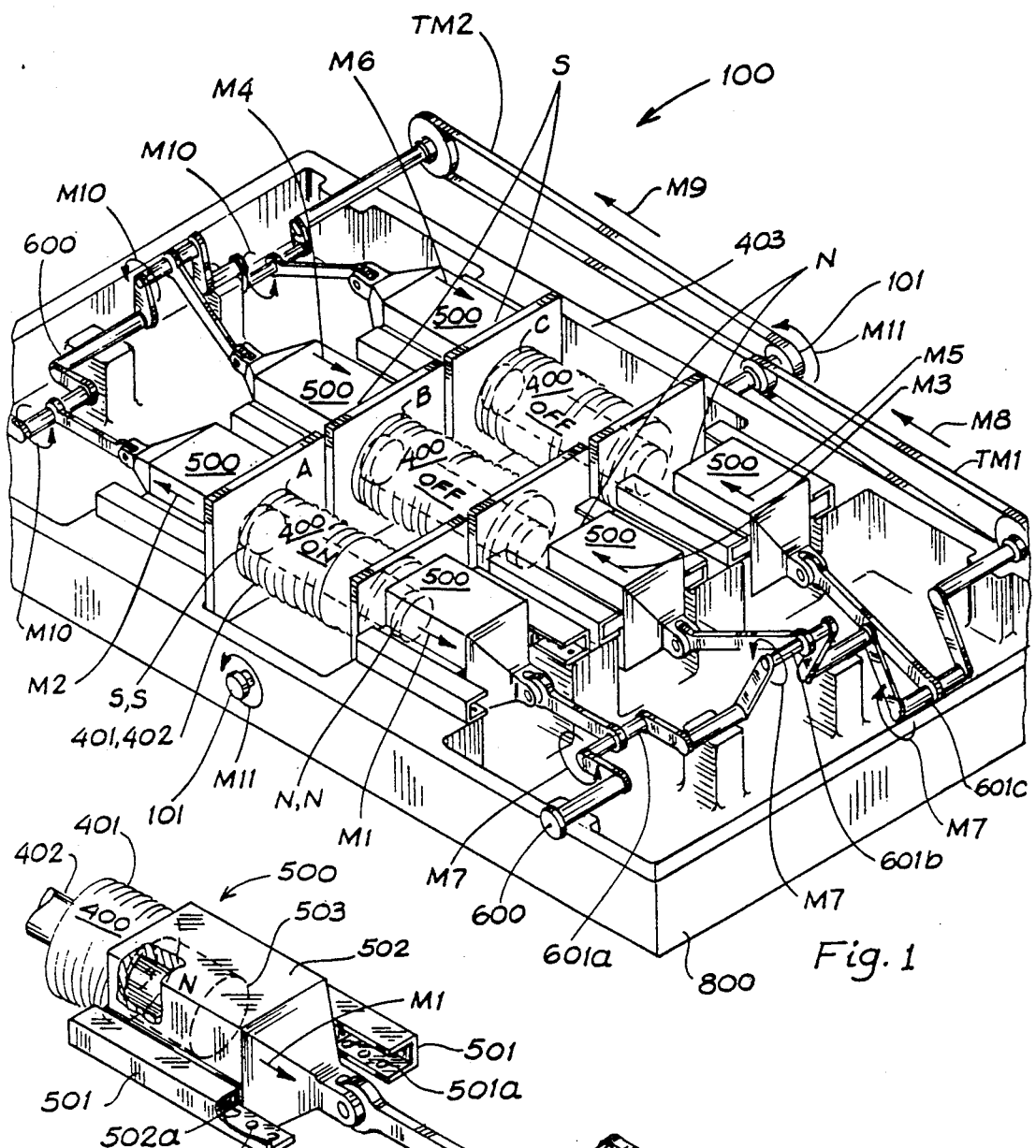
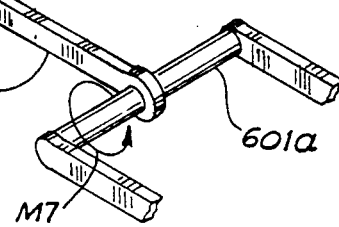

ELECTROMAGNETICALLY POWERED ENGINE APPARATUS AND METHOD

FIELD OF THE INVENTION

This invention relates to engine apparatus and methods for producing work at an output thereof. More particularly, the present invention relates to electrically powered engine apparatus and method of producing work at an output thereof. Even more particularly, the present invention relates to electromagnetically powered engine apparatus that produce work at an output thereof by means of combining electromagnet devices to drive a mechanical arrangement of elements to produce propulsion useful in vehicles and other power input dependent apparatus.

DESCRIPTION OF THE PRIOR ART

The principles of work are considered well known to the artisan as they relate to rectilinear and rotary motion of an object, suffice it to say that it concerns the transference of energy produced by the motion of an object by application of a force and is measured by the product of the force and displacement of the object. The internal combustion engine is a known apparatus employed to perform work by cranking a crankshaft. The advantage to mankind in having the internal combustion engine, is without question, superior to other tools developed by man to manage the daily tasks of living, including the electric motor whose rotor equates to the crankshaft in performing work. The internal combustion engine has had much research attention and has been perfected to yield great satisfaction in work efficiency, torque and speed, but, while the advantages are recognized by all, the polluting disadvantages to the environment have been largely ignored to the detriment of society. Electric motors have replaced many machine application formerly relying on the internal combustion engines, and while they have also enjoyed much technological advances, they have not been perfected to the point of replacing the greatest source of pollution, namely the automobile engine, (see Wall Street Journal Articel entitled: "GA Says It Plans an Electric Car, but Details Are Spotty", page B1, dated Thursday Apr. 19, 1990).

The internal combustion engine requires timely firing of a spark within a cylinder chamber having gone through a compression stroke to produce the power stroke that moves a piston/rod in a reciprocating manner to drive a crankshaft having a power output attachment. The end-use apparatus of the power output attachment are many, and include the automobile which has required many engine variations and cylinder block configurations to harness the energy produced at the crankshaft that results into propulsion of the automobile. The electric motors traditionally require large battery units to continually produce rotating drivetrain power, and as alluded to in the Wall Street article, have yet to be commercially attractive as an alternative engine technology.

Therefore, a need is seen to exist for an engine apparatus that maintains the attributes of an internal combustion engine, including high performance parameters such as horsepower ratings, speed and torque packaged in a small volume and that further includes the non-polluting attributes of an electric motor without the need for large storage battery units.

SUMMARY OF THE INVENTION

Accordingly, the primary object of the present invention is to provide an engine apparatus having high performance parameters, such as horsepower ratings, speed and torque without the disadvantages of an internal combustion engine, primarily pollution associated with the use of petroleum products.

Another object of the present invention is to provide an engine that operates clean similar to the electric motor but that is more efficient in the conversion of electrical energy to mechanical energy.

A related object of the present invention is to provide a vehicular apparatus that utilizes an engine having the foregoing objects.

Yet another object of the present invention is to provide a method of cranking a crankshaft using an engine having the foregoing objects.

The present invention provides the foregoing objects by providing an engine apparatus that combines the reciprocating action of an internal combustion engine but that utilizes electrical energy to produce a magnetic field that initiates a repelling power stroke that is maintained in a reciprocating state by a movable magnet means that is attracted to a stationary magnet means. A power source is pulsed ON to repeatedly produce the repelling power stroke and pulsed OFF to repeatedly allow the movable magnet mean to attract to the stationary magnet means. The underlying principles of the engine allow engine configurations from at least one stationary magnet means and at least one movable magnet means.

Therefore, to the accomplishments of the foregoing objects, the invention consists of the foregoing features hereinafter fully described and particularly pointed out in the claims, the accompanying drawings and the following disclosure describing in detail the invention, such drawings and disclosure illustrating two of the various ways in which the invention may be practiced.

BRIEF DESCRIPTION OF THE DRAWINGS

FIG. 1 is a perspective view of the present invention illustrating an engine apparatus which includes a symmetrical bank arrangement of three unitarily operational electromagnet means and opposed pairs of permanent magnet means capable of reciprocating action on respective crankshafts, the permanent magnet means illustrated are rectangular structure having a permanent magnet embedded interiorly and exterior side flanges slideably supported by rail supports.

FIG. 2 is a partial enlarged cutaway view of one permanent magnet means of the type employed in FIG. 1, showing in cutaway an energized electromagnet core at N magnetic polarization and a N polarized embedded permanent magnet combining to cause the permanent magnet means to be repelled from the electromagnet's core.

DESCRIPTION OF THE PREFERRED EMBODIMENT

Figure 3:
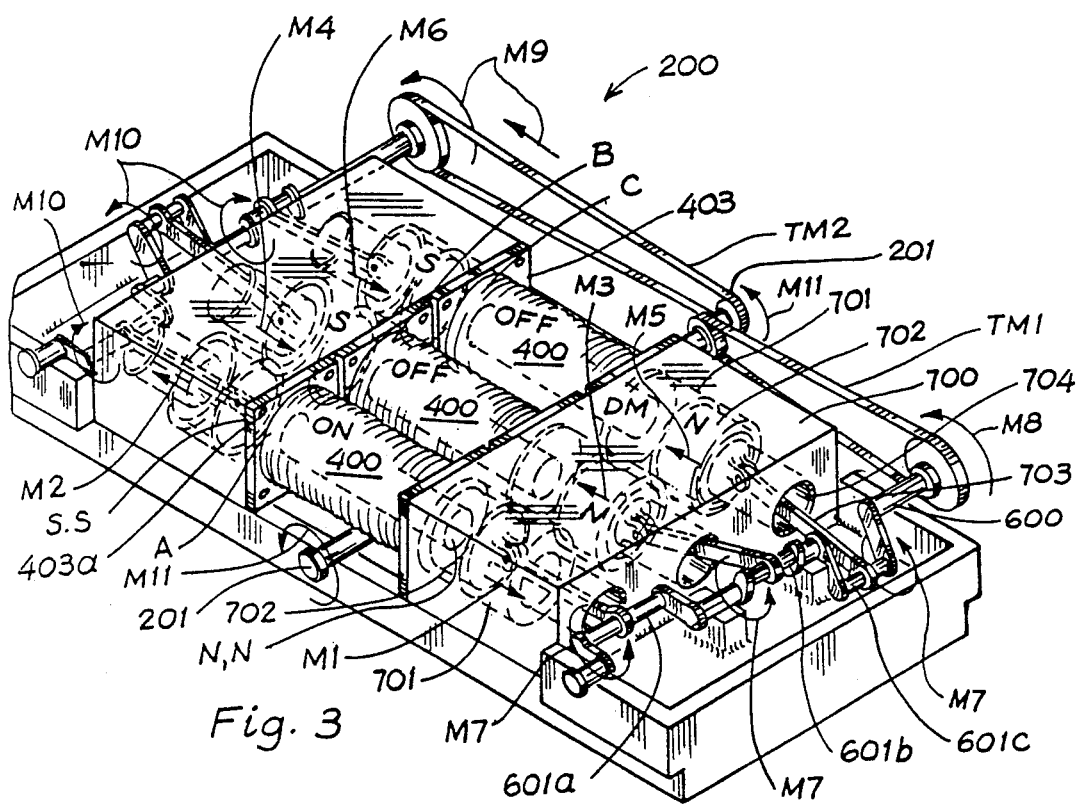
FIG. 3 is a perspective view of an alternate embodiment of the present invention illustrating an engine apparatus which also includes a symmetrical bank arrangement of three unitarily operational electromagnet means and opposed pairs of permanent magnet means capable of reciprocating action on respective crankshafts similar to the embodiment illustrated in FIG. 1 except that the permanent magnet means illustrated here includes a block enclosure for the movable permanent magnet means comprising a piston-like device having a permanent magnet embedded interiorly.
Figure 4:
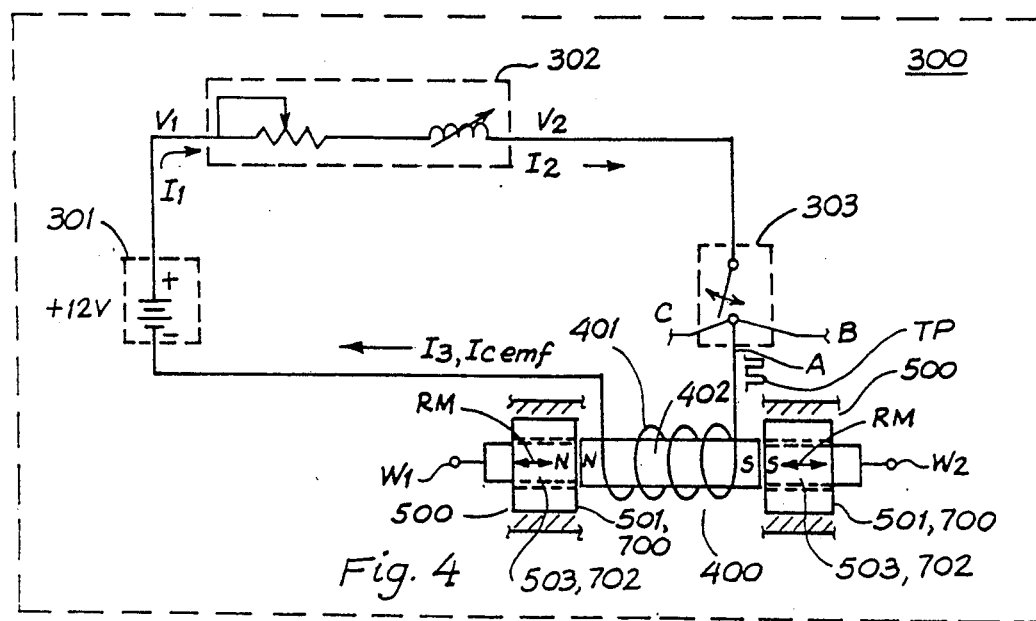
FIG. 4 is an electrical block diagram representation for powering one member of the electromagnetically powered engine in accordance with the present invention and illustrates opposed reciprocating permanent magnet means producing work W1 and W2 deliverable to a crankshaft or similar power transfer means.

By Example, FIGS. 1 and 3 are embodiments 100 and 200 of the present invention analogous to a six cylinder internal combustion engine. The analogy is limited, however, to the reciprocating nature for turning a crankshaft 600 to produce output power drive motions M11 at driveshaft ends 101 and 102, respectively. Before detailing the primary elements of the present invention as embodied in FIGS. 1 and 3, it is believed best to briefly discuss the magnetic phenomenon involved in operation of the engine apparatus of the present invention. As best understood from a rudimentary electrical block diagram 300 shown in FIG. 4, a power source, such as a 12 v battery source 301 inputs current I1 and voltage V1 to step-up coil 302 that outputs voltage V2 and current I2 to a timed on/off electrical energy switch 303 that can direct timed electrical impulses TP, via either inputs A, B or C, to electromagnet means 400 to return current I3 to power source 301. Electromagnet means 400 comprises a coil member 401 and a magnet core member 402, coil member 401 is believed to contribute a counter electromotive force component of current Icemf to return current I3 that helps to maintain the charge on power source 301. For reasons believed to be attributable to parallel resistance effects, electromagnet 400 can deliver higher magnetic field strength with less heat build-up in the coil if coil 401 is wound using twisted pair of magnet wire as opposed to winding the coil using a single strand of magnet wire of the same geuge. Magnet core member 402 is preferably a soft magnetic material operable under cyclic magnetized conditions from timed pulse TP to produce magnetic poles N and S thereon said core member 402. Arranged in close magnetic coupling relation to electromagnet means 400 is a movable permanent magnet means 500, whose hard magnetic material is selected to have a permanent magnetic member 503, 703 having polarized state N or S identical to the polarity of adjacent side of electromagnet core member 402. The object of such arrangement being to force movable permanent magnet means 500 to produce reciprocating motion RM about slide supports 501, 700 by successive repelling and attracting power strokes to produce simultaneous work output W1 and W2. The repelling power stroke being initiated by a single pulse TP from power source 301, 302, 303 that polarizes core member 402 as shown, i.e. with a magnetic polarity N identical with the polarity of the adjacent permanent magnet 503, 702. During the off-state of TP, and hence the demagnetized state DM on core member 402, permanent magnet 503, 702 attract toward core member 402 to produce the attraction power stroke that completes one cycle of operation. Although FIG. 4 shows a pair of magnet means 500, it is to be understood that the reciprocating motion can be accommplished with only one such movable magnet means 500. Further, although a permanent magnet means 500 is discussed in the preferred embodiment, a movable electromagnet (not shown) could be employed having timed pulses that provide alternating magnetic repelling and attracting conditions in concert with stationary electromagnet 400.

Referring now to FIGS. 1 and 3 and recalling the above described one cycle of operation of the present invention, the plurality of six permanent magnet means will now be discussed. It should also be understood that the force in the repelling and attraction power strokes, designated M1, M2 and M3, M4, M5, M5, respectively, in FIGS. 1 and 3 is a function of the magnetic materials used in core memeber 402 and in permanent magnet members 503 and 702, as well as efficiency factors associated with the electromagnet means 400. The repulsion and attraction forces determines the torque and revolution per minute delivered at outputs 101 and 201. In FIG. 1 an engine 100 is built upon a base 800 whereon three electromagnetic means 400 are centrally located about symmetrically arranged permanent magnet means 500. Each electromagnetic means 400 has coil 401, a core member 402 and support end plates 403, said coil 401 being electrically coupled via inputs A, B, and C from a power source such as the power source illustrated in FIG. 4. Upon each input terminal of coil 401 receiving an electrical pulse TP to power electromagnet 400 ON, the magnetic field produced causes core member 402 to be magnetically polarized S, N, left to right, as shown in FIG. 1. By design, an opposite polarity on core 402 would result if TP were to be invertedly applied. It should be understood that in the symmetrical arrangement of FIGS. 1 and 3, only one electromagnet means is ON to repel the axially opposed movable permanent magnet means 500, as indicated by repelling motion force arrows M1 and M2, while the other two electromagnet means 400 are OFF with movable permanent magnet means 500 in a state of being attracted toward the respective core members of the electromagnet means 400 as indicated by attracting motion force arrow M3, M4, M5, M6. As shown in FIG. 1, permanent magnet means 500 on the right side have permanent magnet members 503 polarized at N while the permanent magnet members 503 on the left are polarized at S.

Figure 7:
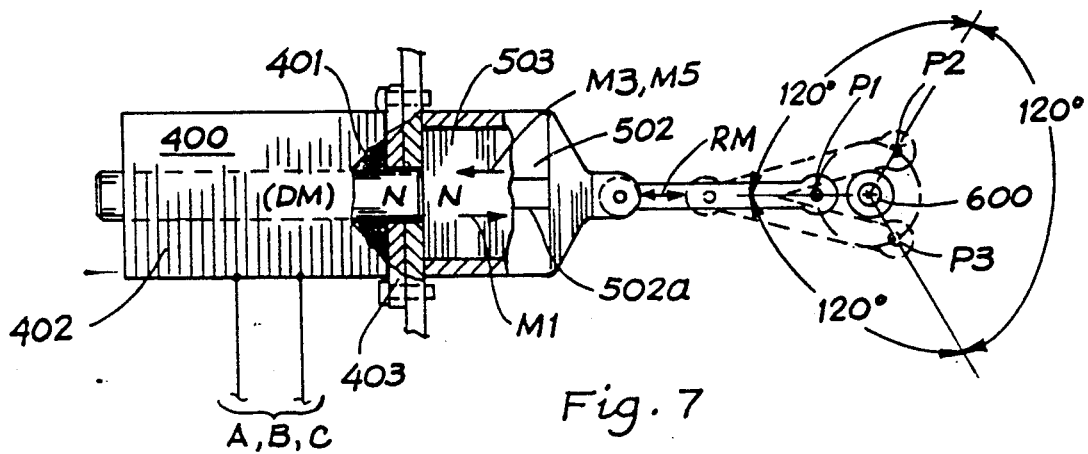
FIG. 7 is an enlarged cutaway view of the electromagnet and permanent magnet means employed in FIG. 1, illustrating an input power leads to the coil members, the demagnetized (DM) and magnetized states possible during timed pulsating power delivery and a suggested 120 degree spacing in the positioning of the cranks of the crankshaft.

FIG. 2 shows an enlarged view of the movable permanent magnet means depicted in FIG. 1 wherein a rectangular geometrical structure 502 encases the permanent magnet 503. Rectangular structure 502 is free to move by virtue of extending flanges 502a being slideably supported on ball bearings 501a attached on a bottom side of support channels 501. The principles of operation are as discussed above, and depend on pulsed enerigization of electromagnet means 400. Permanent magnet means 500 is pivotably coupled to a rod member 504, which rod member 504 is pivotably coupled to a crank 601a of crankshaft 600. Each permanent magnet member having its respective rod coupled to the cranks 601a, 601b, and 601c. FIG. 7 shows a side view of the electromagnet means-permanent magnet means engine of FIG. 1 wherein of interest is the angular positions P1, P2 and P3 of the cranks 601a, 601b and 601c, which positions are preferably at 120 degree offset between each crank. Upon crank 601a receiving motion M1, resulting motion M7 is imparted on crankshaft 600 which transfers the produced power to transfer means TM1, such as a belt drive, in the direction M8 and onto power output shaft 101 as outpower drive having motion M11. The symetrical left hand side operates simultaneously in that M2 produces motion M10 which transfers the power via transfer means TM2 and produces complementary power combinable at shaft 101, as indicated by force motion arrow M9. Utilization of the produced output power at shaft 101 are many, but preferably includes a vehicular application, not shown, where a drivetrain, axle and wheels are attached to output 101 for effecting propulsion.

Figure 5:
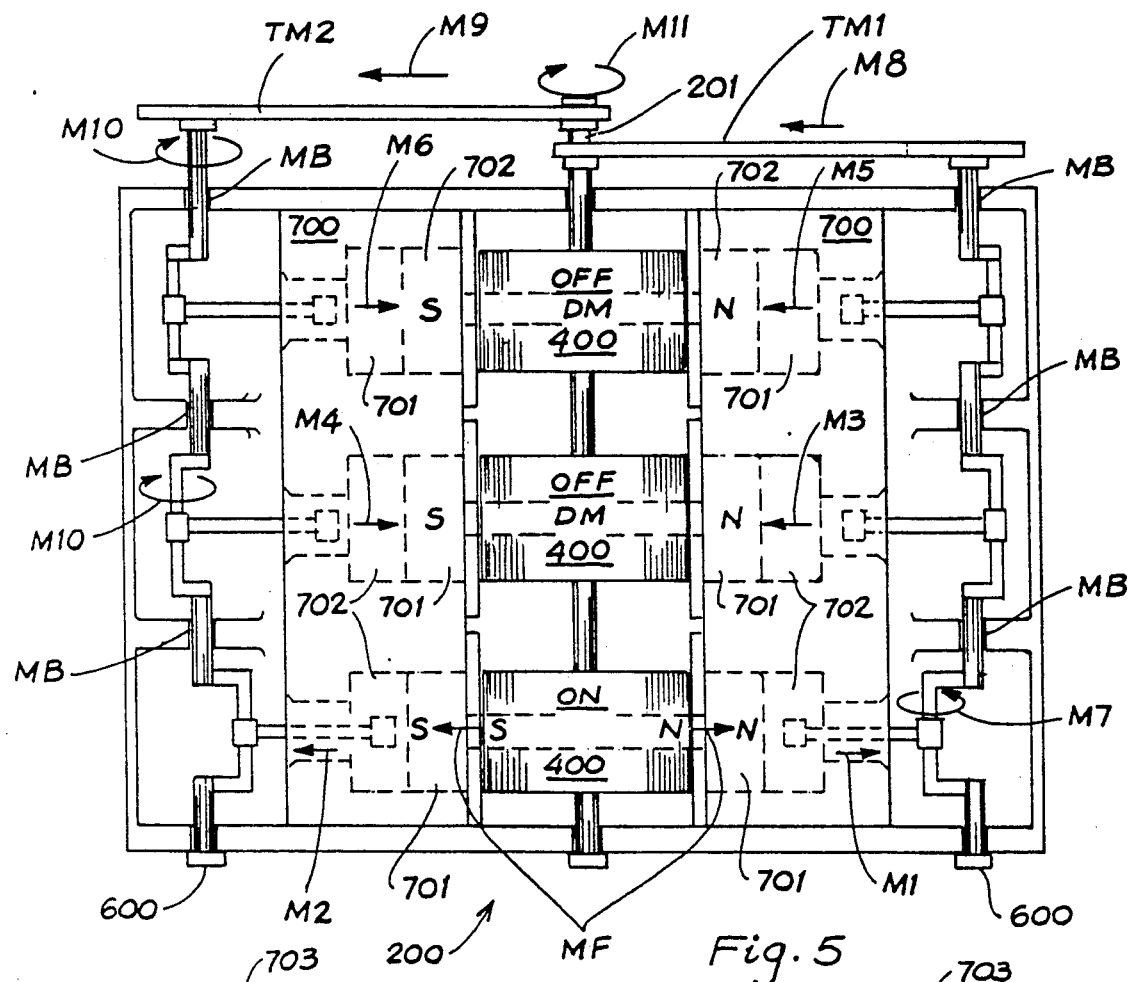
FIG. 5 is a plan view of the engine apparatus illustrated in FIG. 3 illustrating primarily the reciprocating motion of the symmetrical pairs of permanent magnet means during a period of electrical pulsation of one electromagnet member.
Figure 6:
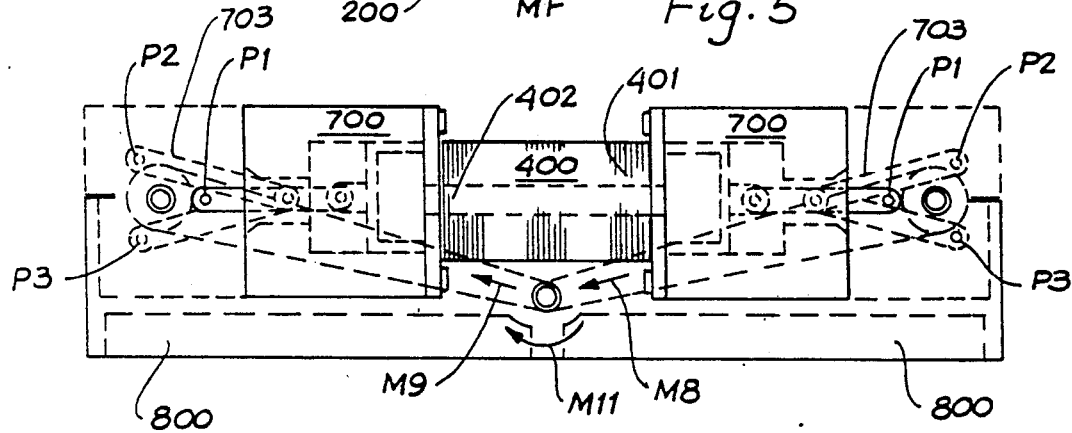
FIG. 6 is an end side view of the engine apparatus illustrated in FIG. 5.
Figure 8:
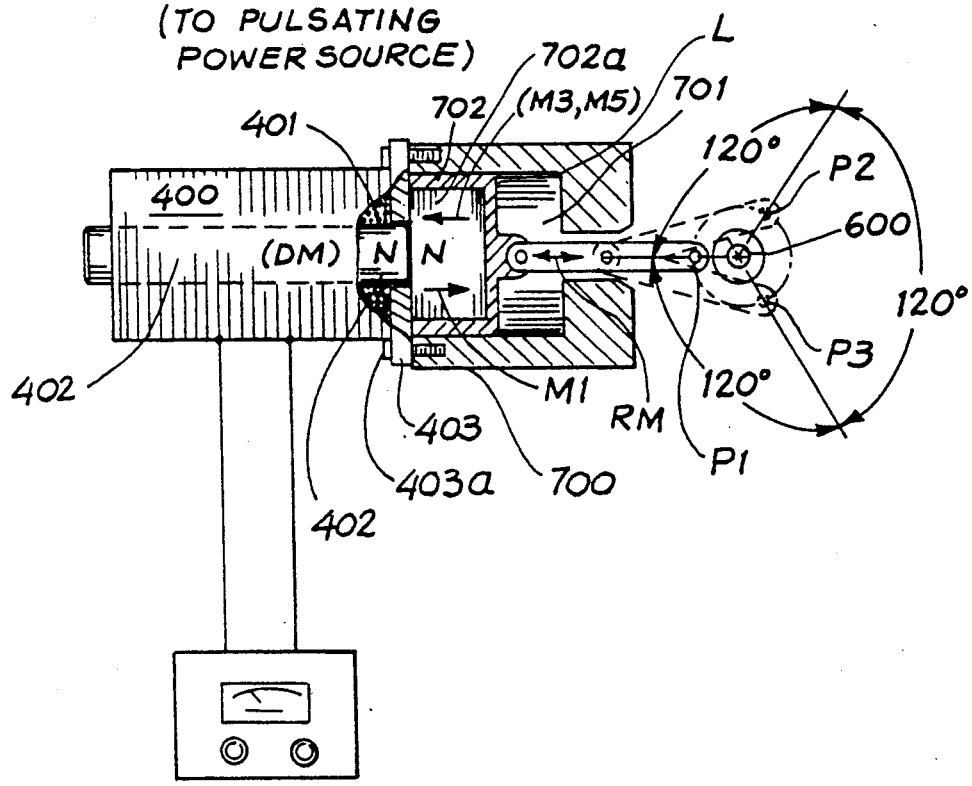
FIG. 8 is also an enlarged cutaway view of the electromagnet and permanent magnet means employed in FIG. 3, illustrating an input power lead connected to the electrical system depicted in FIG. 4 and also showing the demagnetized (DM) and magnetized states possible during timed pulsating power delivery by the electrical system and a suggested 120 degree spacing in the positioning of the cranks of the crankshaft.

Referring now to FIGS.3, 5, 6 and 8, engine 200 operates in a similar manner as engine 100 shown in FIG. 1. Engine 100 and 200 differ primarily in their construction related to the movable permanent magnet means. Engine 200 is built on the block and cylinder concept of the internal combustion engine. Thus, a block 700 supported on base 800 having a plurality of symmetrically arranged cylinder chamber 701 are positioned flanking a plurality of centrally supported electromagnet means 400, here three electromagnets 400. A permanent magnet means 702 in the form of a ringed piston-like device is adapted having a permanent magnet 702a placed interiorly. Frictional consideration would require having a suitable lubricant L between the walls of the chamber 701 and piston-like permanent magnet means 702. Further, rod member 703 would require a bore 704 sized to accommodate upward and downward travel during the reciprocating action RM. Also shown in FIG. 3 are bolt means 403 for attaching electromagnet means 400 to the sides of block 700. FIG. 5 is a plan view, showing additionally, the placement of main bearings MB on crankshaft 600 and the interface repelling magnetic force MF that causes the repelling of the piston-like permanent magnet means 702. FIG. 6 shows a side view of engine 200 and the associated travel of rods 703 as the cranks 601a, 601b and 601c rotate from position P1 to P2 to P3. FIG. 8 shows a side view of the electromagnet means-permanent magnet means engine of FIG. 3 wherein of interest is also the angular positions P1, P2 and P3 of the cranks 601a, 601b and 601c, which positions are also preferably at 120 degree offset between each crank. FIG. 8 further shows the close magnetic interface between the electromagnet's core member 402 and the permanent magnet member 702a to repel the piston-like device 702 and the symbolized demagnetized state DM that results in piston-like device 702 being attracted to core member 402. Additionally, the mechanical interface for attaching plates 403 are detailed as well as a power source comprising of the components 301, 302 and 303 as shown in FIG. 3.

Therefore, while the present invention has been shown and described herein in what is believed to be the most practical and preferred embodiments, it is recognized that departures can be made therefore within the scope of the invention, which is therefore not to be limited to the details disclosed therein but is to be accorded the full scope of the claims so as to embrace any and all equivalent apparatus.

We claim:
1. An engine apparatus, said apparatus comprising:
   energy source means for powering said apparatus; and
   at least one electromagnet-permanent magnet means electrically coupled to said energy source means for cracking a shaft and converting energy from said energy source to work, said at least one electromagnet-permanent magnet means comprising an electromagnet member and at least one movable permanent magnet member having one end coupled to a rod coupled to said shaft, said electromagnet member having a coil member and a fixedly and centrally located magnetic core member, said core member being arranged in a magnetic coupling relation with said at least one permanent magnet member to repel said at least one permanent magnet member during an on-state of energizing said coil member and to attract said at least one permanent magnet member during an off-state deenergization of said coil member to crank said shaft.

2. An engine apparatus as recited in claim 1 wherein said at least one electromagnet-permanent magnet means further comprising:
   a fixed mechanical member arranged to slideably support said at least one movable permanent magnet member.

3. An engine apparatus as recited in claim 2 wherein:
   said movable permanent magnet member comprising a piston-like device having a permanent magnet embedded interiorly; and
   said fixed mechanical member comprising a block having a cylindrical chamber to slideably support said piston-like device.

4. An engine apparatus as recited in claim 2 wherein:
   said movable permanent magnet member comprising a geometrical structure having a permanent magnet embedded interiorly and exterior side flanges; and
   said fixed mechanical member comprising support rails for slideably supporting said geometrical structure.

5. An engine apparatus as recited in claim 1 wherein said energy source means includes:
   a direct current voltage source.

6. An engine apparatus as recited in claim 1 wherein said energy source means includes:
   a switching direct current power supply.

7. An engine apparatus as recited in claim 1, wherein:
   said coil member being electrically coupled to said energy source means for producing a pulsating on-off magnetic field during said on/off-states that simultaneously magnetizes said core member at a first and second polarity; and
   said at least one movable permanent magnet member having another end magnetized at a permanent polarity identical to said first polarity and being located in said produced pulsating on-off magnetic field to effect a reciprocating mechanical action that cranks said shaft.

8. An engine apparatus as recited in claim 7 wherein said at least one electromagnet-permanent magnet means further comprises:
a fixed mechanical member arranged to slideably support said at least one movable permanent magnet member.

9. An engine apparatus as recited in claim 8 wherein said movable permanent magnet member being a piston-like device having a permanent magnet embedded interiorly and said fixed mechanical member is a block having a cylindrical chamber to slideably support said piston-like device.

10. An engine apparatus as recited in claim 8 wherein said movable permanent magnet member comprises a
geometrical structure having a permanent magnet embedded interiorly and exterior side flanges; and
said fixed mechanical member comprises support rails for slideably supporting said geometrical structure.

11. An engine apparatus as recited in claim 7 wherein: said coil member being synchronously pulsated by said energy source to maintain said reciprocating mechanical action.

12. An engine apparatus as recited in claim 11 wherein said at least one electromagnet-permanent magnet means further includes:
a second permanent magnet member for producing a respective reciprocating mechanical action simultaneously with said reciprocating mechanical action produced by said at least one permanent magnet member, said second permanent magnet member having an end magnetized at a permanent polarity identical to said second polarity and being located in said produced pulsating on-off magnetic field to effect said respective reciprocating mechanical action, said at least one permanent magnet member and said second permanent magnet member each being mechanically coupled to a respective crankshaft for transferring respective reciprocating action to a common drive train.

13. An engine apparatus as recited in claim 12 wherein said apparatus further includes a symmetrical bank arangement of a plurality of unitarily operational electromagnet means and associated pairs of movable permanent magnet members, each side of said bank arrangement having a common crankshaft coupled to each permanent magnet member located on that same side, each common crankshaft being coupled to a common output driveshaft for transferring each respective symmetrical side's reciprocating action.

14. An engine apparatus as recited in claim 13 wherein said at least one electromagnet-permanent magnet means further comprises:
a fixed mechanical member arranged to slideably support said at least one movable permanent magnet member.

15. An engine apparatus as recited in claim 14 wherein:
said movable permanent magnet member comprising a piston-like device having a permanent magnet embedded interiorly; and
said fixed mechanical member comprising a block having a cylindrical chamber to slideably support said piston-like device.

16. An engine apparatus as recited in claim 14 wherein:
said movable permanent magnet member comprises a geometrical structure having a permanent magnet embedded interiorly and exterior side flanges; and
said fixed mechanical member comprises support rails for slideably supporting said geometrical structure.

17. An engine apparatus, said apparatus comprising energy source means for powering said apparatus; and
at least one electromagnet-permanent magnet means electrically coupled to said energy source means for cranking a shaft and covering energy from said energy source to work, said at least one electromagnet-permanent magnet means comprising at least one permanent magnet means having a movable permanent magnet member for cranking said shaft and a fixed mechanical member arranged to slideably support said movable permanent magnet member, said at least one electromagnet-permanent magnet means further comprising an electromagnet member, said electromagnet member having a coil member and a fixedly and centrally located magnetic core member, said core member being arranged in a magnetic coupling relation with said movable permanent magnet member to repel said movable permanent magnet member during an on-state of energizing said coil member and to attract said permanent magnet member during an off-state deenergization of said coil member to crank said shaft.

18. An engine apparatus as recited in claim 17 wherein:
said movable permanent magnet member comprising a piston-like device having a permanent magnet embedded interiorly; and
said fixed mechanical member comprising a block having a cylindrical chamber to slideably support said piston-like device.

19. An engine apparatus as recited in claim 17 wherein:
said movable permanent magnet member comprising a geometrical structure having a permanent magnet embedded interiorily and exterior said flanges; and
said fixed mechanical member comprising support rails for slideably supporting said geometrical structure.

20. An engine apparatus as recited in claim 17 wherein said at least one electromagnet-permanent magnet means further includes:
said coil member being electrically coupled to said energy source means for producing a pulsating on-off magnetic field during said on/off states that simultaneously magnetizes said core member at a first and second polarity; and
said movable permanent magnet member having an end magnetized at a permanent polarity identical to said first polarity and being located in said produced pulsating on-off magnetic field to effect a reciprocating mechanical station that cranks said shaft.

21. An engine apparatus as recited in claim 20 wherein:
said coil member being a continuous twisted pair of magnetic wire wound on said core member, said coil member producing reduced input current, less dissipated power and a higher magnetic field intensity when compared to a single strand of magnetic wire wound on said core member.

22. An engine apparatus, said apparatus comprising: energy source means for powering said apparatus; and at least one electromagnet-permanent magnet means electrically coupled to said energy source means for cranking a shaft and converting energy from said energy source to work, said at least one electromagnet-permanent magnet means comprising at least one permanent magnet means having a movable permanent magnet member for cranking said shaft and a fixed mechanical member arranged to slideably support said movable permanent magnet member, said movable permanent magnet member comprising a piston-like device having a permanent magnet embedded interiorly, and said fixed mechanical member comprising a block having a cylindrical chamber to slideably support said piston-like device, said at least one electromagnet-permanent magnet means further comprising an electromagnet member, said electromagnet member having a coil member and a fixedly and centrally located magnetic core member, said core member being arranged in a magnetic coupling relation with said permanent magnet member to repel said permanent magnet member during an on-state of energizing said coil member and to attract said permanent magnet member during an off-state deenergization of said coil member to crank said shaft.

23. An engine apparatus as recited in claim 22 wherein said at least one electromagnet-permanent magnet means further includes:
   said coil member being electrically coupled to said energy source means for producing a pulsating on-off magnetic field during said on/off states that simultaneously magnetizes said core member at a first and second polarity; and
   said embedded permanent magnet having an end magnetized at a permanent polarity identical to said first polarity and being located in said produced pulsating on-off magnetic field to effect a reciprocating mechanical action that cranks said shaft.

24. A vehicular apparatus having a drivetrain, axle and wheels for effecting propulsion, said apparatus comprising;
   energy source means for powering said apparatus; and
   at least one electromagnet-permanent magnet means electrically coupled to said energy source means for cranking a shaft coupled to said drivetrain, axle and wheels for converting energy from said energy source to work and producing said propulsion, said at least one electromagnet-permanent magnet means comprising an electromagnet member and at least one movable permanent magnet member having one end coupled to a rod coupled to said shaft, said electromagnet member having a coil member and a fixedly and centrally located magnetic core member, said core member being arranged in a magnetic coupling relation with said at least one permanent magnet member to repel said at least one permanent magnet member during an on-state of energizing said coil member and to attract said at least one permanent magnet member during an off-state deenergization of said coil member to crank said shaft and produce said propulsion.

25. A vehicular apparatus having a drivetrain, axle and wheels, for effecting propulsion, said apparatus comprising:
   energy source means for powering said apparatus; and
   at least one electromagnet-permanent magnet means electrically coupled to said energy source means for cranking a shaft coupled to said drivetrain, axle and wheels for converting energy from said energy source to work and producing said propulsion, said at least one electromagnet-permanent magnet means comprising at least one permanent magnet means having a movable permanent magnet member for cranking said shaft and a fixed mechanical member arranged to slideably support said movable permanent magnet member, said at least one electromagnet-permanent magnet means further comprising an electromagnet member, said electromagnet member having a coil member and a fixedly and centrally located magnetic core member, said core member being arranged in a magnetic coupling relation with said permanent magnet member to repel said permanent magnet member during an on-state of energizing said coil member and to attract said permanent magnet member during an off-state deenergization of said coil member to crank said shaft.

26. A method of cranking a crankshaft, said method comprising the steps of:
   (a) providing an engine apparatus having said crankshaft, said engine apparatus comprising:
   energy source means for powering said apparatus, and
   at least one electromagnet-permanent magnet means electrically coupled to said energy source means for cranking said crankshaft and converting energy from said energy source to work, said at least one electromagnet-permanent magnet means comprising an electromagnet member and at least one movable permanent magnet member having one end coupled to a rod coupled to said shaft, said electromagnet member having a coil member and a fixedly and centrally located magnetic core member, said core member being arranged in a magnetic coupling relation with said at least one permanent magnet member to repel said at least one permanent magnet member during an on-state of energizing said coil member and to attract said at least one permanent magnet member during an off-state deenergization of said coil member to crank said shaft and produce said propulsion;
   (b) synchronously energizing and deenergizing said coil member from said energy source means producing on/off power states that result in producing on/off pulsating magnetic fields;
   (c) repelling said permanent magnet member during said on-states;
   (d) attracting said permanent magnet member to said core member during said of-states;
   (e) repeating said steps (c) and (d) and producing reciprocating action at said rod end of said permanent magnet member connected to said crankshaft; and
   (f) cranking said crankshaft by said produced reciprocating action.

* * * * *